US012710877B2

(12) United States Patent
Heath

(10) Patent No.: US 12,710,877 B2
(45) Date of Patent: Aug. 18, 2026

(54) MEMORY SYSTEM BOOT SEQUENCE WITH REDUCED LATENCY

(71) Applicant: Micron Technology, Inc., Boise, ID (US)

(72) Inventor: Nicholas T. Heath, Pittsboro, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/170,636

(22) Filed: Apr. 4, 2025

(65) Prior Publication Data

US 2025/0335096 A1 Oct. 30, 2025

Related U.S. Application Data

(60) Provisional application No. 63/640,777, filed on Apr. 30, 2024.

(51) Int. Cl.
*G06F 12/00* (2006.01)
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC .... G06F 3/0611; G06F 3/0659; G06F 3/0679; G06F 3/061; G06F 3/0629; G06F 3/0683
See application file for complete search history.

(56) References Cited

U.S. PATENT DOCUMENTS

2005/0091425 A1* 4/2005 Wyatt .................. G06F 3/0674 710/33
2018/0121212 A1* 5/2018 Luo ........................ G06F 1/305

* cited by examiner

*Primary Examiner* — Shawn X Gu
(74) *Attorney, Agent, or Firm* — Holland & Hart LLP

(57) ABSTRACT

Methods, systems, and devices for memory system boot sequence are described. A host system may assert a signal (e.g., a fast boot signal) to a pin of a memory system, which may instruct the memory system to communicate data at a first data rate (e.g., a relatively lower data rate) before negotiating to a higher data rate (e.g., a highest data rate). The host system may output the fast boot signal to the memory system based on an estimated size of the data to be transferred, a dynamic measurement of the data, an application associated with the data, or any combination thereof. Based on transferring the data, the host system and the memory system may negotiate to an increased data rate (e.g., up to the highest supported data rate).

20 Claims, 5 Drawing Sheets

MEMORY SYSTEM BOOT SEQUENCE WITH REDUCED LATENCY

CROSS REFERENCE

The present Application for Patent claims priority to U.S. Patent Application No. 63/640,777 by Heath, entitled "MEMORY SYSTEM BOOT SEQUENCE WITH REDUCED LATENCY," filed Apr. 30, 2024, which is assigned to the assignee hereof, and which is expressly incorporated by reference in its entirety herein.

TECHNICAL FIELD

The following relates to one or more systems for memory, including memory system boot sequence with reduced latency.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
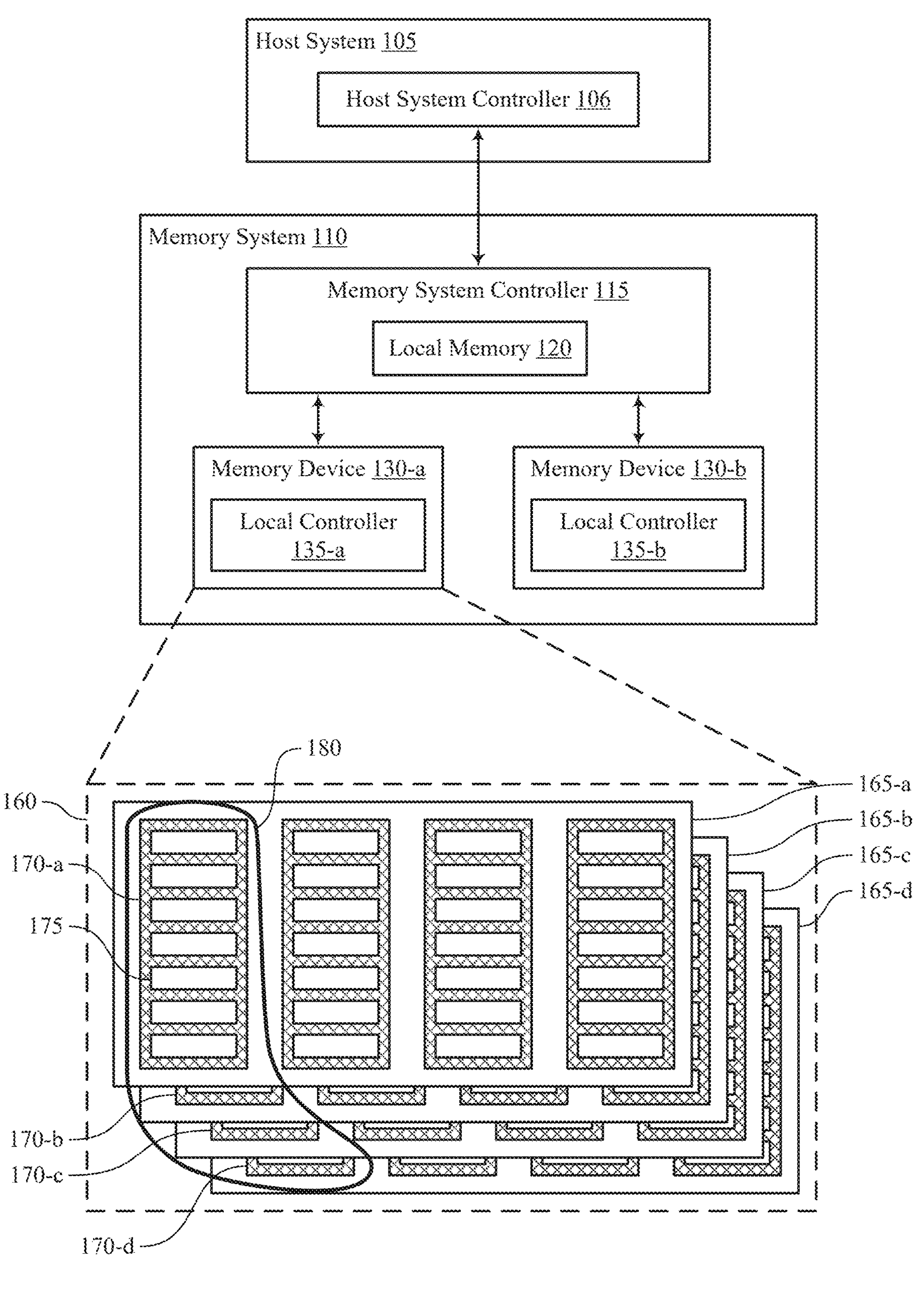
FIG. 1 shows an example of a system that supports a memory system boot sequence with reduced latency in accordance with examples as disclosed herein.

A host system and a memory system may support different data rates for transferring data between the host system and the memory system. In such examples, the host system and the memory system may negotiate a data rate (e.g., a highest data rate) supported by both systems. For example, the host system and the memory system may negotiate the data rate in response to the memory system transitioning from a first power state to a second power state (e.g., when powering on, after boot-up sequence, after exiting a sleep mode). In some examples, the negotiation between the host system and memory system may incur latency in the boot-up sequence based on increasing the data rate through a defined sequence. For example, a memory system that supports a relatively high data rate may negotiate to an initial data rate and then a next data rate before negotiating to the relatively high data rate (e.g., the highest supported data rate). Some applications (e.g., time-sensitive applications) may benefit from a faster boot-up sequence where the host system accesses data from the memory system to initialize the applications without the latency incurred from negotiating to the highest data rate.

The systems, methods, and techniques described herein may support a host system asserting a signal (e.g., a fast boot signal) to instruct a memory system to boot-up and initially communicate data at a first data rate (e.g., a relatively lower data rate) before negotiating to a higher data rate. Such a process may allow for low-latency dependent applications to be initialized quickly after the boot-up using the first data rate. The later the second data rate may be configured, after the low-latency dependent applications have completed the tasks. For example, the host system may assert the fast boot signal to a pin of the memory system, which may instruct the memory system to boot-up and initially communicate the data at a lowest supported data rate. In some examples, the host system may output the fast boot signal based on an estimated size of the data to be transferred, a dynamic measurement of the data, an application associated with the data, or any combination thereof. Based on transferring the data, the host system and the memory system may negotiate to an increased data rate (e.g., up to the highest supported data rate) as part of the boot-up sequence. By transferring the data to the host system at the first data rate before increasing to a second data rate, the memory system may enable some applications (e.g., a back-up camera feed) to initialize relatively quickly, which may reduce latency and improve the system's overall performance.

In addition to applicability in memory systems as described herein, techniques for a memory system boot sequence with reduced latency may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by transferring data to initialize high-performance applications according to a lower data rate before negotiating to a higher data rate, which may decrease latency times, improve response times, or otherwise improve user experience, among other benefits.

Features of the disclosure are illustrated and described in the context of systems, devices, and circuits. Features of the disclosure are further illustrated and described in the context of a process flow diagram and flowcharts.

FIG. 1 shows an example of a system 100 that supports a memory system boot sequence with reduced latency in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a may* include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

A host system 105 and a memory system 110 may support different data rates for transferring data between the host system 105 and the memory system 110. In such examples, the host system 105 and the memory system 110 may negotiate a data rate (e.g., a highest data rate) supported by both systems. For example, the host system 105 and the memory system 110 may negotiate the data rate in response to the memory system 110 transitioning from a first power state to a second power state (e.g., when powering on, after boot-up sequence, after exiting a sleep mode). In some examples, the negotiation between the host system 105 and the memory system 110 may incur latency based on increasing the data rate through a defined sequence. For example, a memory system 110 that supports a relatively high data rate may negotiate to an initial data rate and then a next data rate before negotiating to the relatively high data rate (e.g., the highest supported data rate). Some applications (e.g., time-sensitive applications) may benefit from the host system 105 accessing data from the memory system to initialize the applications without the latency incurred from negotiating to the highest data rate.

As described herein, a host system 105 may assert a signal (e.g., a fast boot signal) to instruct a memory system 110 to communicate data at a first data rate (e.g., a relatively lower data rate) before negotiating to a higher data rate. For example, the host system 105 may assert the fast boot signal to a pin of the memory system 110, which may instruct the memory system 110 to communicate the data at a lowest supported data rate. In some examples, the host system 105 may output the fast boot signal based on an estimated size of the data to be transferred, a dynamic measurement of the data, an application associated with the data, or any combination thereof. Based on transferring the data, the host system 105 and the memory system 110 may negotiate to an increased data rate (e.g., up to the highest supported data rate). By transferring the data to the host system 105 at the first data rate before increasing to a second data rate, the memory system 110 may enable some applications (e.g., a back-up camera feed) to initialize relatively quickly, which may reduce latency and improve the overall performance of the memory system 110.

Figure 2:
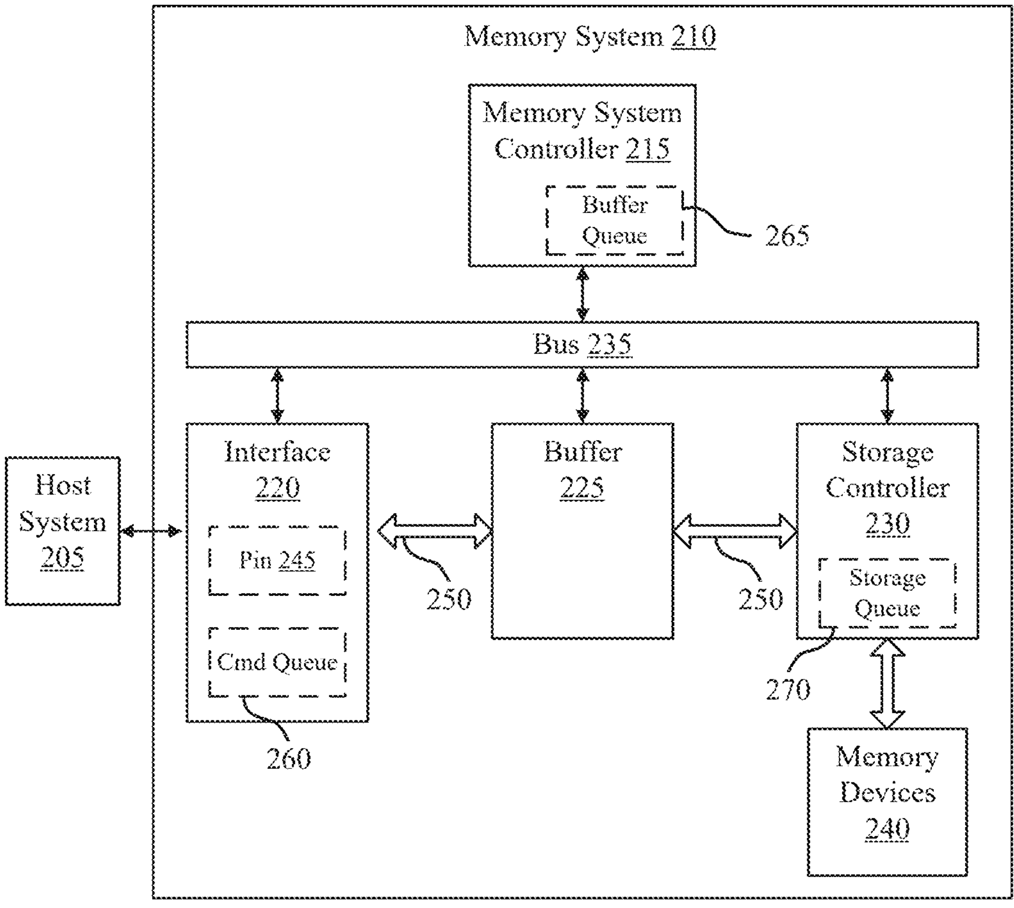
FIG. 2 shows an example of a system that supports a memory system boot sequence with reduced latency in accordance with examples as disclosed herein.

FIG. 2 shows an example of a system 200 that supports a memory system boot sequence with reduced latency in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 (e.g., a peripheral component interface (PCI) or a peripheral component express interface (PCIe)) for communication with the host system 205, and a buffer 225 for temporary storage of data being transferred between the host system 205 and the memory devices 240. The interface 220, buffer 225, and storage controller 230 may support transferring data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

In some cases, one or more queues (e.g., a command queue 260, a buffer queue 265, a storage queue 270) may be used to control the processing of access commands and the movement of corresponding data. Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. In some examples, a pin 245 may be separate from a bus 235 that delivers data. For example, the signal output by the host system 205 to the pin 245 may be conveyed along the non-data path. The memory system controller 215 may control how and if data is transferred between the host system 205 and the memory devices 240 by communicating with the data path components over the bus 235 (e.g., using a protocol specific to the memory system 210).

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. To process a write command received from the host system 205, the memory system controller 215 may determine if the buffer 225 has sufficient available space to store the data associated with the command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a “ready to transfer” indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. The storage controller 230 may indicate to the memory system controller 215 (e.g., via the bus 235) that the data transfer to one or more memory devices 240 has been completed. In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection).

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command. In some cases, the buffer queue 265 may support buffer storage of data associated with read commands in a similar manner as discussed with respect to write commands. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data.

After the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, the host system 205 and the memory system 210 may support different data rates for transferring data. For example, a memory system 210 may support one data rate and the host system 205 may support another data rate higher than the data rate supported by the memory system 210. Based on the different data rates, the host system 205 and the memory system 210 may negotiate their link (e.g., the connection through the interface 220) to a data rate supported by both systems. That is, as used herein "negotiating" or "negotiating a data rate" may refer to any process or operation where the memory system 210 and the host system 205 exchange, or otherwise indicate, capability information (e.g., a supported data rate), determine a data rate supported by each system based on the capability information, and communicate data according to the data rate. In some examples, the host system 205 and the memory system 210 negotiate the data rate to the highest rate that each system supports. For example, a memory system 210 that supports a data rate of 6 Gb/s (e.g., based on a supported data rate of one or more memory devices 240) may start communicating data with the host system 205 at a data rate of 1.5 Gb/s before negotiating up (e.g., increasing the data rate) to 6 Gb/s.

The negotiation to higher data rates may be based on a sequence known (e.g., predefined or standardized) to the host system 205 and the memory system 210. For example, a memory system 210 that supports multiple data rates (e.g., Gen1, Gen2, Gen4, etc.) may begin communications at an initial data rate (e.g., Gen1), may increase the communication speed to a next data rate (e.g., Gen2), and may finally increase to a highest data rate (e.g., Gen4). In some examples, the host system 205 and the memory system 210 may negotiate the data rate based on the memory system 210 transitioning from a lower power state to a higher power state (e.g., power-on or exiting a sleep mode).

In some examples, the negotiations to higher data rates may increase latency and a time-to-ready (TTR) of the memory system 210. For example, the host system 205 may negotiate with the memory system 210 to the highest supported data rate by default, as communicating data with the memory system 210 at a highest data rate may be desirable. However, negotiating between the host system 205 and the memory system 210 up to the highest supported data rate may degrade performance because the host system 205 may wait longer to perform access operations with the memory system 210 while the data rate is negotiated.

In some examples, the host system 205 may benefit from refraining to negotiate to a higher data rate after the memory system 210 transitions to a higher power state. For example, the host system 205 may provide data (e.g., high priority data) from the memory system 210 to one or more time-sensitive applications before the host system 205 and memory system 210 increase the communication speed to a highest data rate. Accordingly, valuable time may be saved such that the memory system 210 may be able to perform time-sensitive functions before incurring the additional latency associated with negotiating to a highest data rate.

In some examples, the one or more time-sensitive applications may be initialized when the memory system 210 transitions power states. In some instances, the time-sensitive applications may be associated with relatively high priority data. Such time-sensitive applications may be or may include automotive applications such as a back-up camera feed, infotainment systems, parking sensors, and the like. The techniques described herein may support functions associated with such time-sensitive applications being performed before the host system 205 and memory system 210 increase the communication speed to a highest data rate, which may allow for the time-sensitive application functions to be performed relatively quickly.

The host system 205 may output a signal (e.g., a hardware signal) to the pin 245 at the interface 220 to instruct the memory system 210 to negotiate a data rate lower than a highest supported data rate (e.g., the lowest supported data rate between both systems). The host system 205 may either set the pin to a first value to negotiate the link at the lower data rate to transfer the high priority data (e.g., perform fast boot), or the host system 205 may set the pin to a second value to negotiate the link to the higher data rate (e.g., perform a normal boot). As described further with reference to FIG. 3, the memory system 210 may receive the signal based on one or more applications, a size of the high priority data, or any combination thereof. In some examples, the memory system 210 may receive the signal after transitioning from a relatively low power state (e.g., the memory system 210 is off or in a sleep mode) to a higher power state. The memory system 210 and the host system 205 may negotiate to a higher data rate after the host system 205 receives the high priority data. For example, based on transmitting the high priority data (e.g., and initializing one or more applications), the memory system 210 may perform one or more access operations according to a highest data rate supported by both systems.

Figure 3:
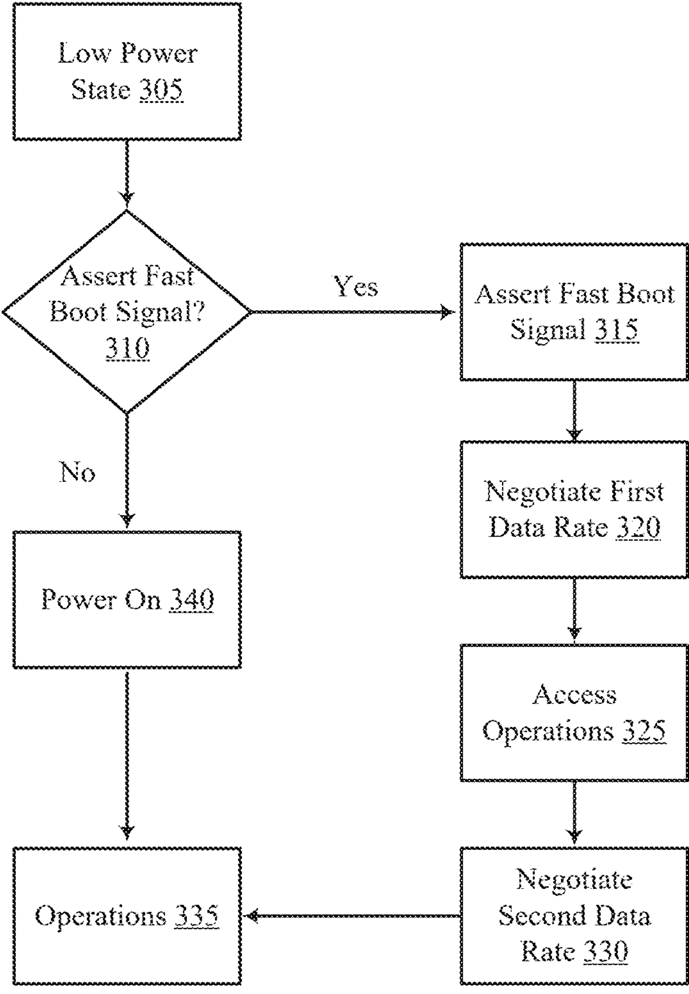
FIG. 3 shows an example of a process flow diagram that supports a memory system boot sequence with reduced latency in accordance with examples as disclosed herein.

FIG. 3 shows an example of a process flow diagram 300 that supports a memory system boot sequence with reduced latency in accordance with examples as disclosed herein. The process flow diagram 300 may be implemented by aspects of a memory system and a host system as described with reference to FIGS. 1 and 2.

An example of a system that may use the fast boot-up techniques described herein may be an automotive application. Many vehicles are equipped with memory systems that support other components of the vehicle (e.g., back-up cameras, infotainment centers, and/or advanced driver assistance systems (ADAS)). After starting a vehicle, some users of the vehicle desire some functionality to be initialized soon after starting the car. For example, some drivers of a vehicle may start a vehicle and soon thereafter being backing up the vehicle (e.g., down a driveway or out of a parking stall). The boot-up sequency of the memory system in the vehicle may contribute to the delay in initializing the back-up camera of the vehicle. To reduce the delay in initializing some systems (e.g., the back-up camera in a vehicle), the memory system may include these techniques to perform a fast boot-up sequence. In this sequence, the memory system may initially begin communicating data at a slower speed to transfer data so that some applications (e.g., the back-up camera of the vehicle) may begin operating with a shorter delay. Then sometime later, the memory system may negotiate a faster speed to transfer data after the low-latency applications have been initialized.

At 305, a memory system may enter a low power state (e.g., power off or enter a sleep mode). In some examples, at 310, a host system (e.g., the host system 205) may determine whether to output a signal (e.g., a fast boot signal). The fast boot signal may instruct the memory system to communicate a quantity of data according to a first rate. For example, the fast boot signal may instruct the memory system to communicate the data according to a data rate lower (e.g., a lowest supported data rate) than a highest data rate supported by both the memory system and the host system, as described further with reference to FIG. 2. In some examples, the data may be associated with a first priority level (e.g., the data is relatively high priority data). For example, the memory system (e.g., the memory system 210) may transfer data associated with the first priority level to initialize one or more applications, such as a backup camera, various sensors (e.g., monitoring sensors), infotainment system, or the like.

In some examples, the host system may determine to output the fast boot signal to the memory system. For example, the host system may default to assert the fast boot signal or not (e.g., to boot normally). Additionally, or alternatively, the host system may output the signal based on one or more conditions. For example, one or more applications (e.g., time-sensitive applications such as a back-up camera feed, parking sensors, or the like) may initialize sooner based on the memory system communicating the high priority data according to the lower data rate with the host system. The memory system may receive the signal based on the one or more applications (e.g., the host system may determine the one or more applications may benefit from the fast boot signal and output the signal to the memory system).

In some examples, the memory system may receive the signal based on an estimated quantity of the data, a quantity of the data, or any combination thereof. For example, the host system, the memory system (e.g., the memory system controller 215), or both, may determine that the quantity of the data satisfies a first threshold value. Additionally, or alternatively, the host system, the memory system, or both, may determine an estimated quantity of data satisfies a second threshold value (e.g., equal to or different than the first threshold value).

In some examples, the threshold values (e.g., the first threshold, the second threshold, or both) may correspond to a duration for the memory system to communicate a quantity of data less than or equal to a duration for the host system and the memory system to negotiate the highest data rate (e.g., the memory system may receive the signal if communicating the high priority data is relatively faster than negotiating up to the highest data rate). In other examples, the threshold values may correspond to a quantity of data associated with initializing an application. For example, an application may initialize based on a variable quantity of data, and the host system, the memory system, or both, may estimate the quantity of data to initialize the application. The memory system may receive the fast boot signal based on the quantity of data satisfying the first threshold or the estimated quantity of data satisfying the second threshold.

At 315 the host system may assert the fast boot signal to a pin (e.g., the pin 245 as described with reference to FIG. 2). At 320, the memory system may negotiate a data rate lower (e.g., a lowest supported data rate) than a highest data rate supported by both the memory system and the host system based on receiving the signal from the pin. For example, the memory system may sample the fast boot signal and negotiate the slowest link speed for relatively quick access (e.g., compared to performing the negotiation to the highest data rate) with the host system on power up. At 325, the host system may perform one or more access operations to communicate the quantity of data according to the lower data rate. For example, the host system may read or write to the memory system at the slowest supported data rate.

At 330, the host system and the memory system may increase the data rate to a data rate higher than the lower data rate based on communicating the quantity of data. At 335, the memory system may perform access operations (e.g., read or write) at increased data rate (e.g., the highest data rate). In some examples, data communicated according to the increased data rate may be associated with the second priority level lower than the first priority level of the quantity of data communicated according to the lower data rate.

In some examples, at 340, the host system may determine to not output the fast boot signal (e.g., based on one or more applications that are not time-sensitive). In such examples, the host system and the memory system may negotiate to the data rate higher than the lower data rate (e.g., the highest supported data rate) without the memory system first booting to the lower data rate. The memory system and the host system may continue to 335, in which the memory system may perform access operations (e.g., read or write) at the higher data rate. By transferring the data to the host system at the lower data rate before increasing to the higher data rate, the memory system may enable some applications (e.g., a back-up camera feed) to initialize relatively quickly, which may reduce latency and improve the overall performance of the memory system.

Figure 4:
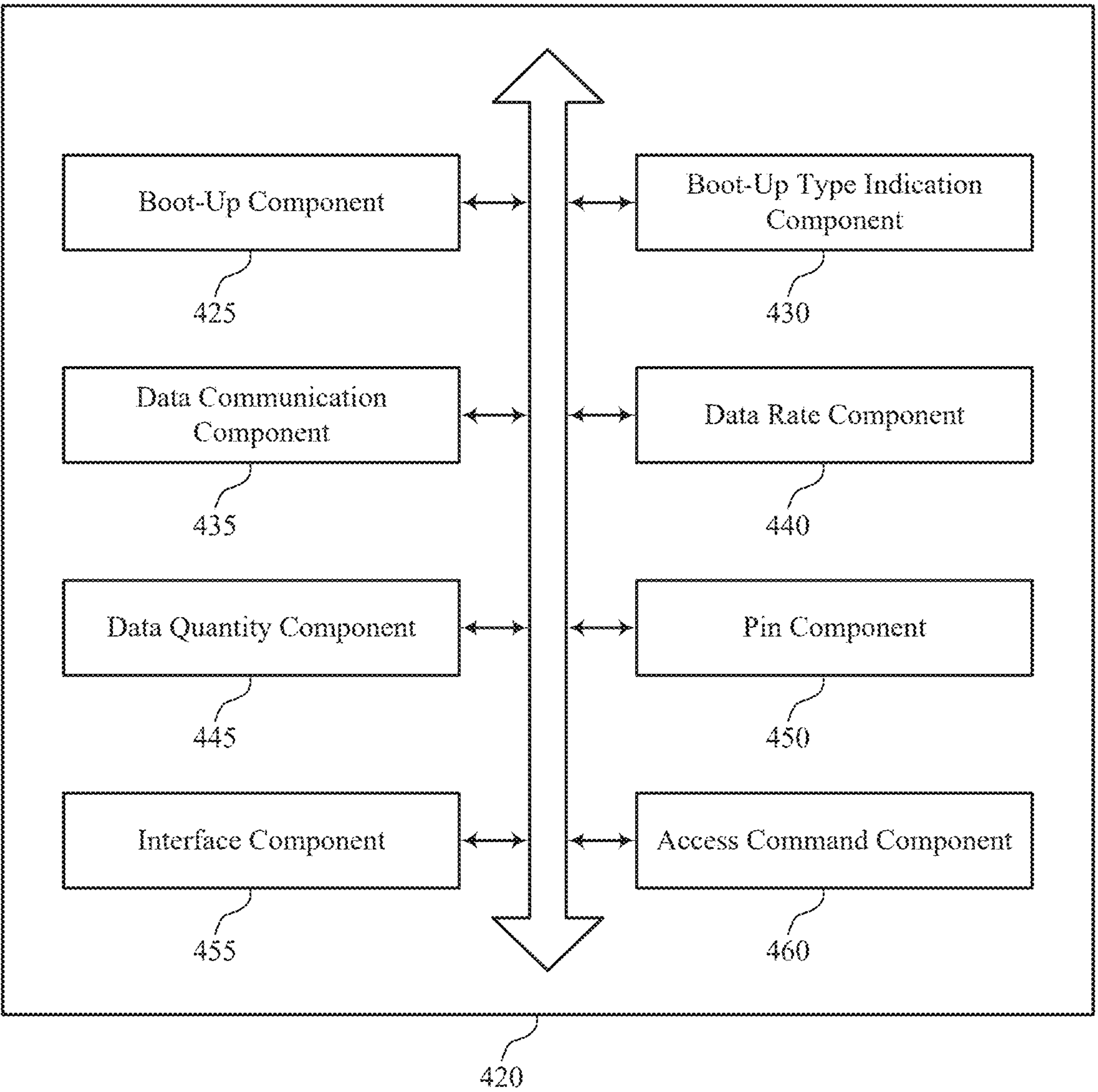
FIG. 4 shows a block diagram of a memory system that supports a memory system boot sequence with reduced latency in accordance with examples as disclosed herein.

FIG. 4 shows a block diagram 400 of a memory system 420 that supports a memory system boot sequence with reduced latency in accordance with examples as disclosed herein. The memory system 420 may be an example of aspects of a memory system as described with reference to FIGS. 1 through 3. The memory system 420, or various components thereof, may be an example of means for performing various aspects of memory system boot sequence with reduced latency as described herein. For example, the memory system 420 may include a boot-up component 425, a boot-up type indication component 430, a data communication component 435, a data rate component 440, a data quantity component 445, a pin component 450, an interface component 455, an access command component 460, or any combination thereof. Each of these components, or components of subcomponents thereof (e.g., one or more processors, one or more memories), may communicate, directly or indirectly, with one another (e.g., via one or more buses).

The boot-up component 425 may be configured as or otherwise support a means for initiating a boot-up sequence to transition the memory system from a first power state to a second power state. The boot-up type indication component 430 may be configured as or otherwise support a means for receiving, from a host system based on initiating the boot-up sequence, first signaling to indicate that the boot-up sequence is a first type of sequence associated with lower latency. The data communication component 435 may be configured as or otherwise support a means for communicating first data with the host system according to a first data rate based on receiving the first signaling. The data rate component 440 may be configured as or otherwise support a means for increasing a rate for communicating with the host system from the first data rate to a second data rate after communicating the first data, where the first data rate is slower than the second data rate for communicating with the host system.

In some examples, the data communication component 435 may be configured as or otherwise support a means for communicating second data with the host system according to the second data rate based on increasing the rate for communicating with the host system from the first data rate to the second data rate. In some examples, the first data is associated with a first priority level and the second data is associated with a second priority level different from the first priority level.

In some examples, the data rate component 440 may be configured as or otherwise support a means for increasing the rate for communicating with the host system from the second data rate to a third data rate. In some examples, the data communication component 435 may be configured as or otherwise support a means for communicating third data with the host system according to the third data rate based on increasing the rate for communicating with the host system from the second data rate to the third data rate, where the third data rate is faster than the first data rate and the second data rate for communicating with the host system.

In some examples, the data quantity component 445 may be configured as or otherwise support a means for determining that a quantity of the first data satisfies a threshold value based on initiating the boot-up sequence, where receiving the first signaling is based on determining that the quantity of the first data satisfies the threshold value. In some examples, the memory system is configured to boot-up using a second type of sequence associated with a higher latency than the first type of sequence. In some examples, the first signaling is received via a first pin of the memory system. In some examples, the first data is communicated with the host system via an interface different from the first pin.

In some examples, to support communicating the first data with the host system, the access command component 460 may be configured as or otherwise support a means for receiving one or more read commands, transmitting one or more write commands, or both.

In some examples, the first data rate is associated with a slowest data rate for communicating with the host system. In some examples, communicating the first data according to the first data rate is based on an application associated with the first data. In some examples, the first power state is associated with a lower power state than the second power state.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
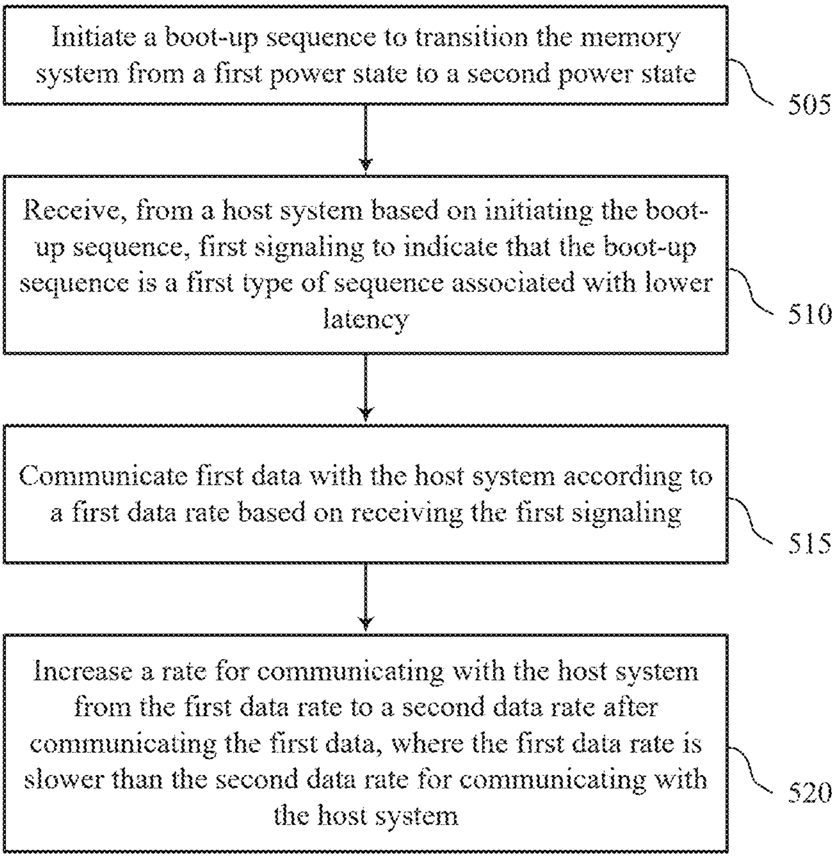
FIG. 5 shows a flowchart illustrating a method or methods that support a memory system boot sequence with reduced latency in accordance with examples as disclosed herein.

FIG. 5 shows a flowchart illustrating a method 500 that supports a memory system boot sequence with reduced latency in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include initiating a boot-up sequence to transition the memory system from a first power state to a second power state. In some examples, aspects of the operations of 505 may be performed by a boot-up component 425 as described with reference to FIG. 4, as well as the operations described at 315 and 340 in FIG. 3.

At 510, the method may include receiving, from a host system based on initiating the boot-up sequence, first signaling to indicate that the boot-up sequence is a first type of sequence associated with lower latency. In some examples, aspects of the operations of 510 may be performed by a boot-up type indication component 430 as described with reference to FIG. 4 and described with reference to the operation described at 315 in FIG. 3 and the pin 245 in FIG. 2.

At 515, the method may include communicating first data with the host system according to a first data rate based on receiving the first signaling. In some examples, aspects of the operations of 515 may be performed by a data communication component 435 as described with reference to FIG. 4, as well as the operation described at 325 in FIG. 3.

At 520, the method may include increasing a rate for communicating with the host system from the first data rate to a second data rate after communicating the first data, where the first data rate is slower than the second data rate for communicating with the host system. In some examples, aspects of the operations of 520 may be performed by a data rate component 440 as described with reference to FIG. 4, as well as the operation described at 330 in FIG. 3.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for initiating a boot-up sequence to transition the memory system from a first power state to a second power state; receiving, from a host system based on initiating the boot-up sequence, first signaling to indicate that the boot-up sequence is a first type of sequence associated with lower latency; communicating first data with the host system according to a first data rate based on receiving the first signaling; and increasing a rate for communicating with the host system from the first data rate to a second data rate after communicating the first data, where the first data rate is slower than the second data rate for communicating with the host system.

Aspect 2: The method, apparatus, or non-transitory computer-readable medium of aspect 1, further including operations, features, circuitry, logic, means, or instructions, or any combination thereof for communicating second data with the host system according to the second data rate based on increasing the rate for communicating with the host system from the first data rate to the second data rate.

Aspect 3: The method, apparatus, or non-transitory computer-readable medium of aspect 2, where the first data is associated with a first priority level and the second data is associated with a second priority level different from the first priority level.

Aspect 4: The method, apparatus, or non-transitory computer-readable medium of any of aspects 1 through 3, further including operations, features, circuitry, logic, means, or instructions, or any combination thereof for increasing the rate for communicating with the host system from the second data rate to a third data rate and communicating third data with the host system according to the third data rate based on increasing the rate for communicating with the host system from the second data rate to the third data rate, where the third data rate is faster than the first data rate and the second data rate for communicating with the host system.

Aspect 5: The method, apparatus, or non-transitory computer-readable medium of any of aspects 1 through 4, further including operations, features, circuitry, logic, means, or instructions, or any combination thereof for determining that a quantity of the first data satisfies a threshold value based on initiating the boot-up sequence, where receiving the first signaling is based on determining that the quantity of the first data satisfies the threshold value.

Aspect 6: The method, apparatus, or non-transitory computer-readable medium of any of aspects 1 through 5, where the memory system is configured to boot-up using a second type of sequence associated with a higher latency than the first type of sequence.

Aspect 7: The method, apparatus, or non-transitory computer-readable medium of any of aspects 1 through 6, where the first signaling is received via a first pin of the memory system and the first data is communicated with the host system via an interface different from the first pin.

Aspect 8: The method, apparatus, or non-transitory computer-readable medium of any of aspects 1 through 7, where communicating the first data with the host system includes operations, features, circuitry, logic, means, or instructions, or any combination thereof for receiving one or more read commands, transmitting one or more write commands, or both.

Aspect 9: The method, apparatus, or non-transitory computer-readable medium of any of aspects 1 through 8, where the first data rate is associated with a slowest data rate for communicating with the host system.

Aspect 10: The method, apparatus, or non-transitory computer-readable medium of any of aspects 1 through 9, where communicating the first data according to the first data rate is based on an application associated with the first data.

Aspect 11: The method, apparatus, or non-transitory computer-readable medium of any of aspects 1 through 10, where the first power state is associated with a lower power state than the second power state.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively, (e.g., in an alternative example), be performed “in direct response to” or “directly in response to” such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be “on” or “activated” if a voltage greater than or equal to the transistor’s threshold voltage is applied to the transistor gate. The transistor may be “off” or “deactivated” if a voltage less than the transistor’s threshold voltage is applied to the transistor gate.

The description set forth herein, in connection with the appended drawings, describes example configurations and does not represent all the examples that may be implemented or that are within the scope of the claims. The term “exemplary” used herein means “serving as an example, instance, or illustration” and not “preferred” or “advantageous over other examples.” The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, “or” as used in a list of items (for example, a list of items prefaced by a phrase such as “at least one of” or “one or more of”) indicates an inclusive list such that, for example, a list of at least one of A, B, or C means A or B or C or AB or AC or BC or ABC (i.e., A and B and C). Also, as used herein, the phrase “based on” shall not be construed as a reference to a closed set of conditions. For example, an exemplary step that is described as “based on condition A” may be based on both a condition A and a condition B without departing from the scope of the present disclosure. In other words, as used herein, the phrase “based on” shall be construed in the same manner as the phrase “based at least in part on.”

As used herein, including in the claims, the article “a” before a noun is open-ended and understood to refer to “at least one” of those nouns or “one or more” of those nouns. Thus, the terms “a,” “at least one,” “one or more,” “at least one of one or more” may be interchangeable. For example, if a claim recites “a component” that performs one or more functions, each of the individual functions may be performed by a single component or by any combination of multiple components. Thus, the term “a component” having characteristics or performing functions may refer to “at least one of one or more components” having a particular characteristic or performing a particular function. Subsequent reference to a component introduced with the article “a” using the terms “the” or “said” may refer to any or all of the one or more components. For example, a component introduced with the article “a” may be understood to mean “one or more components,” and referring to “the component” subsequently in the claims may be understood to be equivalent to referring to “at least one of the one or more components.” Similarly, subsequent reference to a component introduced as “one or more components” using the terms “the” or “said” may refer to any or all of the one or more components. For example, referring to “the one or more components” subsequently in the claims may be understood to be equivalent to referring to “at least one of the one or more components.”

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method by a memory system, comprising:

initiating a boot-up sequence to transition the memory system from a first power state to a second power state;

receiving, from a host system based on initiating the boot-up sequence, first signaling to indicate that the boot-up sequence is a first type of sequence associated with lower latency;

communicating first data with the host system according to a first data rate based on receiving the first signaling; and increasing a rate for communicating with the host system from the first data rate to a second data rate after communicating the first data, wherein the first data rate is slower than the second data rate for communicating with the host system.

2. The method of claim 1, further comprising:

communicating second data with the host system according to the second data rate based on increasing the rate for communicating with the host system from the first data rate to the second data rate.

3. The method of claim 2, wherein the first data is associated with a first priority level and the second data is associated with a second priority level different from the first priority level.

4. The method of claim 1, further comprising:

increasing the rate for communicating with the host system from the second data rate to a third data rate; and communicating third data with the host system according to the third data rate based on increasing the rate for communicating with the host system from the second data rate to the third data rate, wherein the third data rate is faster than the first data rate and the second data rate for communicating with the host system.

5. The method of claim 1, further comprising:

determining that a quantity of the first data satisfies a threshold value based on initiating the boot-up sequence, wherein receiving the first signaling is based on determining that the quantity of the first data satisfies the threshold value.

6. The method of claim 1, wherein the memory system is configured to boot-up using a second type of sequence associated with a higher latency than the first type of sequence.

7. The method of claim 1, wherein:

the first signaling is received via a first pin of the memory system; and the first data is communicated with the host system via an interface different from the first pin.

8. The method of claim 1, wherein communicating the first data with the host system comprises:

receiving one or more read commands, transmitting one or more write commands, or both.

9. The method of claim 1, wherein the first data rate is associated with a slowest data rate for communicating with the host system.

10. The method of claim 1, wherein communicating the first data according to the first data rate is based on an application associated with the first data.

11. A non-transitory computer-readable medium storing code, the code comprising instructions executable by one or more processors to:

initiate a boot-up sequence to transition a memory system from a first power state to a second power state;

receive, from a host system based on initiating the boot-up sequence, first signaling to indicate that the boot-up sequence is a first type of sequence associated with lower latency;

communicate first data with the host system according to a first data rate based on receiving the first signaling; and increase a rate for communicating with the host system from the first data rate to a second data rate after communicating the first data, wherein the first data rate is slower than the second data rate for communicating with the host system.

12. The non-transitory computer-readable medium of claim 11, wherein the instructions are further executable by the one or more processors to:

communicate second data with the host system according to the second data rate based on increasing the rate for communicating with the host system from the first data rate to the second data rate.

13. The non-transitory computer-readable medium of claim 12, wherein the first data is associated with a first priority level and the second data is associated with a second priority level different from the first priority level.

14. The non-transitory computer-readable medium of claim 11, wherein the instructions are further executable by the one or more processors to:

increase the rate for communicating with the host system from the second data rate to a third data rate; and communicate third data with the host system according to the third data rate based on increasing the rate for communicating with the host system from the second data rate to the third data rate, wherein the third data rate is faster than the first data rate and the second data rate for communicating with the host system.

15. The non-transitory computer-readable medium of claim 11, wherein the instructions are further executable by the one or more processors to:

determine that a quantity of the first data satisfies a threshold value based on initiating the boot-up sequence, wherein receiving the first signaling is based on determining that the quantity of the first data satisfies the threshold value.

16. The non-transitory computer-readable medium of claim 11, wherein the memory system is configured to boot-up using a second type of sequence associated with a higher latency than the first type of sequence.

17. The non-transitory computer-readable medium of claim 11, wherein:

the first signaling is received via a first pin of the memory system; and the first data is communicated with the host system via an interface different from the first pin.

18. The non-transitory computer-readable medium of claim 11, wherein the instructions to communicate the first data with the host system are executable by the one or more processors to:

receive one or more read commands, transmitting one or more write commands, or both.

19. The non-transitory computer-readable medium of claim 11, wherein the first data rate is associated with a slowest data rate for communicating with the host system, or wherein communicating the first data according to the first data rate is based on an application associated with the first data.

20. A memory system, comprising:

one or more memory devices; and processing circuitry coupled with the one or more memory devices and configured to cause the memory system to:

initiate a boot-up sequence to transition the memory system from a first power state to a second power state;

receive, from a host system based on initiating the boot-up sequence, first signaling to indicate that the boot-up sequence is a first type of sequence associated with lower latency;

communicate first data with the host system according to a first data rate based on receiving the first signaling; and increase a rate for communicating with the host system from the first data rate to a second data rate after communicating the first data, wherein the first data rate is slower than the second data rate for communicating with the host system.

* * * * *